United States Patent
Pidathala et al.

(10) Patent No.: US 10,997,224 B2
(45) Date of Patent: May 4, 2021

(54) IDENTIFYING PROFANITY IN REAL TIME

(71) Applicants: Murali P. Pidathala, San Jose, CA (US); Ravindra B. Gudapati, Saratoga, CA (US); Suneel Nulu, San Jose, CA (US)

(72) Inventors: Murali P. Pidathala, San Jose, CA (US); Ravindra B. Gudapati, Saratoga, CA (US); Suneel Nulu, San Jose, CA (US)

(73) Assignee: SKOPIC, INC., San Jose, CA (US)

(*) Notice: Subject to any disclaimer, the term of this patent is extended or adjusted under 35 U.S.C. 154(b) by 0 days.

(21) Appl. No.: 15/822,174

(22) Filed: Nov. 26, 2017

(65) Prior Publication Data

US 2019/0163815 A1    May 30, 2019

(51) Int. Cl.
| | | |
|---|---|---|
| *G06F 16/33* | (2019.01) | |
| *G06F 16/35* | (2019.01) | |
| *G06F 16/951* | (2019.01) | |
| *G06F 16/957* | (2019.01) | |

(52) U.S. Cl.
CPC ........ *G06F 16/3344* (2019.01); *G06F 16/353* (2019.01); *G06F 16/951* (2019.01); *G06F 16/957* (2019.01)

(58) Field of Classification Search
CPC .. G06F 16/951; G06F 17/2735; G06F 17/276; G06F 17/277; G06F 17/2872; G06F 17/289; G06F 17/30; G06F 17/30864; G06F 12/14; G06F 16/685; G06F 17/24; G06F 17/278; G06F 17/28; G06F 17/30011; G06F 17/30867; G06F 21/10; G06F 21/121; G06F 3/011; G06F 3/0482; G06F 16/3344; G06F 16/353; G06F 16/957; G06F 17/30684; G06F 17/30707
USPC ........................................................ 707/739
See application file for complete search history.

(56) References Cited

U.S. PATENT DOCUMENTS

| | | | | |
|---|---|---|---|---|
| 8,868,408 | B2* | 10/2014 | Spears | G06F 16/9535 704/9 |
| 8,977,685 | B2* | 3/2015 | Kanter | G06Q 50/01 709/204 |
| 9,077,675 | B2* | 7/2015 | Harris | H04L 12/1895 |
| 10,530,889 | B2* | 1/2020 | Goldenberg | H04L 67/306 |
| 2002/0059221 | A1* | 5/2002 | Whitehead | G06F 16/9535 |
| 2003/0126267 | A1* | 7/2003 | Gutta | G06F 21/85 709/229 |
| 2007/0256093 | A1* | 11/2007 | Hiler | H04N 21/4756 725/28 |
| 2007/0294077 | A1* | 12/2007 | Narayanan | G06F 40/284 704/2 |
| 2011/0246378 | A1* | 10/2011 | Prussack | G06F 17/2785 705/310 |

(Continued)

*Primary Examiner* — Sheree N Brown

(57) ABSTRACT

A computer implemented method and system for detecting a profanity level of a 140-character textual post generated by a user within one or more communities includes: identifying all words present in the 140-character textual post; assigning a weight to each identified word based on whether or not each identified word occurs in one or more databases; calculating a net profanity factor for each identified word based on the assigned weight; calculating a sum of net profanity factors of all the identified words; and publishing or not publishing the 140-character textual post based on the sum of net profanity factors.

15 Claims, 2 Drawing Sheets

(56) References Cited

U.S. PATENT DOCUMENTS

| | | | |
|---|---|---|---|
| 2011/0282727 A1* | 11/2011 | Phan | G06Q 10/10 |
| | | | 705/14.36 |
| 2011/0302123 A1* | 12/2011 | Nista | H04L 67/2823 |
| | | | 706/52 |
| 2014/0074547 A1* | 3/2014 | B'Far | G06Q 10/105 |
| | | | 705/7.28 |
| 2014/0074560 A1* | 3/2014 | B'Far | G06Q 50/01 |
| | | | 705/7.38 |
| 2014/0075500 A1* | 3/2014 | B'Far | H04L 63/102 |
| | | | 726/1 |
| 2015/0039293 A1* | 2/2015 | Viswanathan | G06F 40/284 |
| | | | 704/9 |
| 2015/0178341 A1* | 6/2015 | Kumar | G06Q 30/0202 |
| | | | 707/738 |
| 2015/0220646 A1* | 8/2015 | Goldenberg | G06Q 50/01 |
| | | | 707/748 |

* cited by examiner

IDENTIFYING PROFANITY IN REAL TIME

FIELD OF THE INVENTION

The disclosure generally relates to information-networked communities, and more particularly to identifying profanity in real time within the textual content being posted by users in information-networked local communities.

BACKGROUND OF THE INVENTION

Most traditional social media applications such as Facebook, LinkedIn and Google+ primarily focus on sharing content and posting comments within the specified social distance of a specific user's network and also facilitate connecting to individuals. As such, today's social applications freely allow users to express and publish content in various formats. However, the challenge remains with regards to how to identify profanity in the textual and visual content at the time a user is authoring the content so the system can alert and make an appropriate decision on whether or not such content is appropriate for publishing within a given social context or a setting.

SUMMARY OF THE INVENTION

The disclosure addresses these needs and more by providing a computer implemented method and system for detecting a profanity level of a 140-character textual post generated by a user within one or more communities, which includes identifying all words present in the 140-character textual post; assigning a weight to each identified word based on whether or not each identified word occurs in one or more databases; calculating a net profanity factor for each identified word based on the assigned weight; calculating a sum of net profanity factors of all the identified words; and publishing or not publishing the 140-character textual post based on the sum of net profanity factors.

In one embodiment, the disclosure provides a computer implemented method and system for detecting a profanity level of a 140-character textual post generated by a user within one or more communities, wherein the one or more databases uses SQL or NO SQL language.

In another embodiment, the disclosure provides a computer implemented method and system for detecting a profanity level of a 140-character textual post generated by a user within one or more communities, wherein each identified word is assigned a positive or a negative weight depending on whether the identified word is acceptable or not acceptable within a context of profanity in the one or more databases.

In another embodiment, the disclosure provides a computer implemented method and system for detecting a profanity level of a 140-character textual post generated by a user within one or more communities, wherein a positive weight is assigned if the identified word is acceptable within the context of profanity in the one or more databases.

In another embodiment, the disclosure provides a computer implemented method and system for detecting a profanity level of a 140-character textual post generated by a user within one or more communities, wherein a negative number is assigned if the identified word is not acceptable within the context of profanity in the one or more databases.

In another embodiment, the disclosure provides a computer implemented method and system for detecting a profanity level of a 140-character textual post generated by a user within one or more communities, wherein the net profanity factor is determined by summing all individual weights assigned to each identified word.

In another embodiment, the disclosure provides a computer implemented method and system for detecting a profanity level of a 140-character textual post generated by a user within one or more communities, wherein if a decision is not publishing the 140-character textual post, then routing the 140-character textual post to a community moderator for a decision to publish or not to publish.

In another embodiment, the disclosure provides a computer implemented method and system for detecting a profanity level of a 140-character textual post generated by a user within one or more communities, wherein if no community moderator exists for a given community, then quarantining the 140-character textual post.

In another embodiment, the disclosure provides a computer implemented method and system for detecting a profanity level of a 140-character textual post generated by a user within one or more communities, wherein a proprietary look up database based on user input is used as the one or more databases for a community specific profanity detection.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, size, or applicability of the disclosure. It should be noted that for clarity and ease of illustration these drawings are not necessarily made to scale.

DETAILED DESCRIPTION OF THE EMBODIMENTS

The following description is presented to enable a person of ordinary skill in the art to make and use embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, the present disclosure is not intended to be limited to the examples described herein and shown, but is to be accorded the scope consistent with the claims.

It should be understood that the specific order or hierarchy of steps in the process disclosed herein is an example of exemplary approaches. Based upon design preferences, it is understood that the specific order or hierarchy of steps in the processes may be rearranged while remaining within the scope of the present disclosure. Any accompanying method claims present elements of the various steps in a sample order, and are not meant to be limited to the specific order or hierarchy presented.

The present invention relates to a social platform for developing informed communities, which can be either hyper local or super focused within a specific geographical location. The social information created within the system can be organized, mined and delivered to other community peers seeking information about important and time critical daily matters. Since these communities are organized around common interests, geographical location and/or goals, the participants benefit from the information shared by their community peers. Further details involving this social platform can be found in U.S. Pat. No. 9,690,874, the entire disclosure of which is hereby incorporated by reference in its entirety for all purposes.

Figure 1:
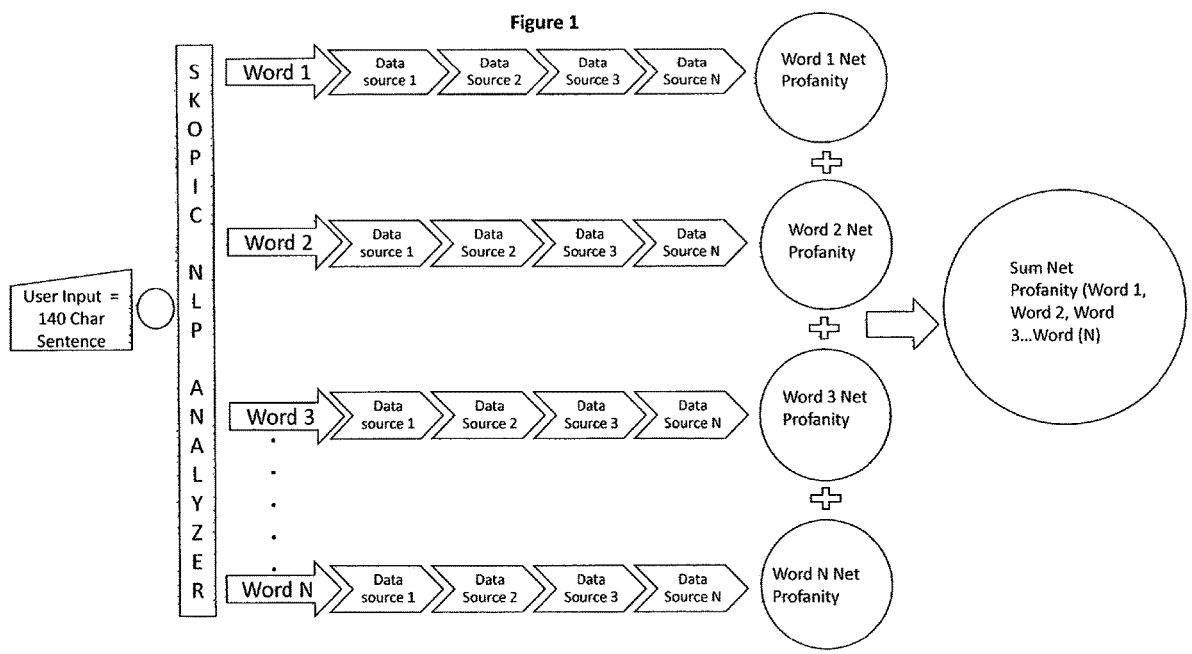
FIG. 1 illustrates an embodiment of a computer implemented method and system of calculating net profanity of each identified word within a 140-character sentence and sum net profanity of a 140-character textual post generated by a user within one or more communities.
Figure 2:
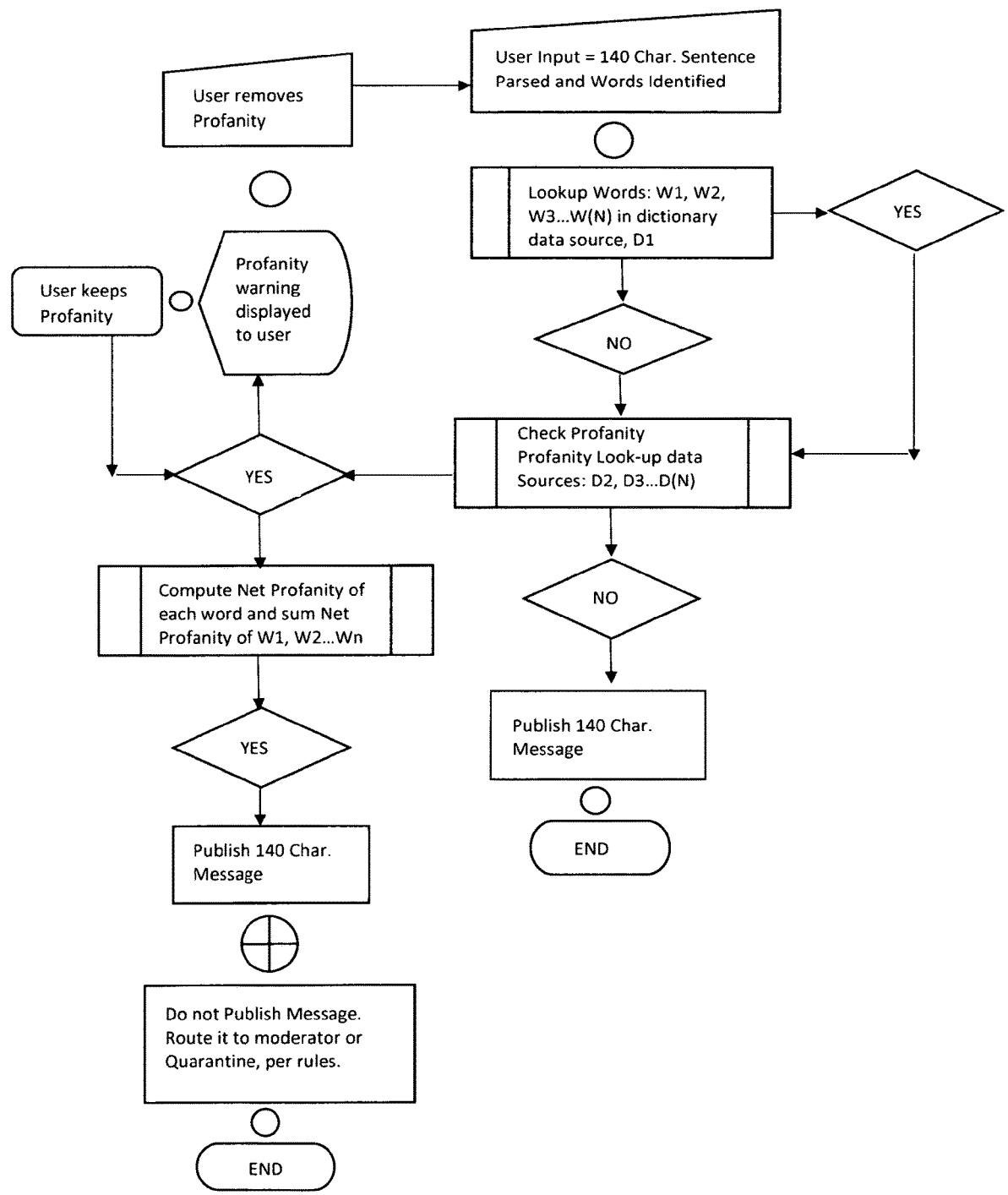
FIG. 2 illustrates an embodiment of a computer implemented method and system of detecting a profanity level of a 140-character textual post generated by a user within one or more communities, which demonstrates a flow chart for the profanity check process.

In the present disclosure, FIG. 1 illustrates an embodiment of a computer implemented method and system for detecting a profanity level of a textual input not exceeding 140-characters, i.e. a "140-character textual post" or a "140-character sentence," generated by a user within one or more computer implemented communities. The detection of profanity level includes calculating net profanity of each identified word within a 140-character sentence and sum net profanity of all words identified therein. The embodiments described herein, seek to identify the level of profanity contained within the 140-character textual post, which users of a computer implemented system are allowed to publish within one or more communities. FIG. 2 illustrates an embodiment of a method and system demonstrating a flow chart for the profanity check process.

The methods for determining the profanity level within a user authored 140-character sentence include parsing of the sentence for identifying every word contained therein, looking up for existence of such word within all data sources provisioned in a database, awarding weights to each identified word based on a proprietary algorithm that is fully parameterized, calculating a net profanity factor of each word, and in turn calculating sum net profanity factor of all words, and allowing the system to make a decision either to publish or not publish the 140-character textual sentence.

The system developed includes the flexibility to: add more data sources for profanity look up; change the sequential path or the order of data sources being looked up for the occurrence of each identified word in the 140-character textual sentence; change the values of weights assigned to each available data source; and/or change the criteria for identifying profanity levels and decision making either to publish or not publish the user post. The system further includes the flexibility to custom define: the weights assigned to each data source and overall profanity level threshold at a single community level to make a decision as to whether or not the user authored 140-character textual sentence can be published. The development of proprietary algorithms involve certain Artificial Intelligence concepts and Machine Learning techniques.

EXAMPLES

Use Case Scenario
Assumptions
1. Say there are 4 words, W1, W2, W3 and W4 identified in a 140-character sentence.
2. Say there are 4 different data sources namely; D1, D2, D3 and D4 to look up.
3. Say D1 is a collection of words from an English Dictionary, D2 is collection of highly offensive or obscene words, D3 is collection of non-standard or coded words that are used as substitutes for direct profanity and D4 is collection of words built with user inputs.
4. Say the weight factors for individual data sources are assigned as; D1=+0.5, D2=−0.2, D3=−0.2 and D4=−0.1.

Say the sequential order of word lookups among these data sources is, D1 to D2, D2 to D3 and D3 to D4.

The system shall have flexibility to incorporate additional data sources at any given time.

STEP 1: If the word W1 has been looked up and found in D1, the word W1 is assigned a weight of +0.5. The presence of word W1 in data source D1 confirms its existence in a standard English dictionary.

STEP 2: If the word W1 has been looked up and found in D2, the word W1 is assigned a weight of −0.2. The presence of word W1 in data source D2 confirms its existence within collection of words having a certain level of profanity or inappropriateness associated with it.

STEP 3: If the word W1 has been looked up and found in D3, the word W1 is assigned a weight of −0.2. The presence of word W1 in data source D3 confirms its existence within collection of words having certain level of profanity or inappropriateness associated with it.

STEP 4: If the word W1 has been looked up and found in D4, the word W1 is assigned a weight of −0.1. The presence of word W1 in data source D4 confirms its existence within collection of words having certain level of profanity or inappropriateness associated with it.

STEP 5: The net profanity factor of the word W1 is determined by the sum of all weights which would be zero (0) in the example stated here (+0.5, −0.2, −0.2, −0.1). The net profanity factor ranges from −0.5 thorough+0.5 depending on the individual weights assigned to each word identified in the 140-character sentence with −0.5 being the highest level of profanity and +0.5 being the least.

STEP 6: A sum of net profanity is determined by adding net profanity factors of all words identified in 140-character sentence and then the system's proprietary algorithm makes a decision whether the post authored by the user can be published or otherwise. If a community is managed or monitored for content, such decision to publish or not publish a 140-character textual sentence is deferred to a moderator should the system detect any level of profanity.

It must also be noted that the values of weights assigned to individual data source can be modified as the system starts to learn from user behavior over a period of time.

In addition to the above, the further development of proprietary algorithms for profanity detection includes, parsing and deeper analysis of user authored sentence and using Artificial intelligence (AI) when contextually relevant words are identified. See a few examples of such scenarios below.

EXAMPLES

1. Is Viagra recommended for erectile dysfunction in men?
2. Which of the living has highest orgasm?
3. What is the best nude bar in town?
4. Do you think Halle Berry is too sexy?
5. I am really pissed with our robotics team.

Some of the key architectural considerations for development and use of profanity detection algorithms in order to functionally implement within the one or more communities include:
1. Choice of database platform, SQL, NO SQL etc.
2. Choice of Data structures.
3. Use of Index and Search engines.

4. Use of Cache, Memory etc.

5. Distributed computing and load balancing for optimal response outcomes.

While the inventive features have been particularly shown and described with reference to preferred embodiments thereof, it will be understood by those in the art that the foregoing and other changes may be made therein without departing from the sprit and the scope of the disclosure. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

What is claimed is:

1. A computer implemented method of monitoring and moderating a profanity level of a not exceeding 140-character textual post generated by an authoring user within one or more communities, comprising:

parsing to identify all words present in the 140-character textual post;

checking, by the computer, in one or more profanity lookup data sources, wherein the one or more data sources includes a collection of words from an English Dictionary, a collection of highly offensive or obscene words, a collection of non-standard or coded words that are used as substitutes for direct profanity, and/or a collection of words built with moderator inputs;

displaying a profanity warning to the authoring user in real time if one or more words in the 140-character textual post is profane;

removing, by the authoring user, the identified one or more profane words in the 140-character textual post, or allowing, by the authoring user, the identified one or more profane words in the 140-character textual post;

assigning, by the computer, a positive weight or a negative weight to each identified word based on whether or not each identified word occurs in one or more weighted profanity lookup data sources, wherein a positive weight indicates the identified word does not have a certain level of profanity or inappropriateness associated with the identified word, and a negative weight indicates the identified word does have a certain level of profanity or inappropriateness associated with the identified word, or vice versa;

calculating a net profanity factor by a parameterized algorithm for each identified word based on a sum of their assigned weights;

calculating a sum of net profanity factors of all the identified words ranging from a positive half to a negative half, compared with a community specific profanity level threshold; and publishing or not publishing the 140-character textual post, wherein if a decision is not publishing the 140-character textual post, then deferring the 140-character textual post and sum net profanity factor to a community moderator for a decision to publish or not to publish the post.

2. The method of claim 1, wherein the one or more data sources uses SQL or NO SQL language.

3. The method of claim 1, wherein each identified word is assigned a positive or a negative weight depending on whether the identified word is acceptable or not acceptable within a context of profanity in the one or more data sources.

4. The method of claim 3, wherein a positive weight is assigned if the identified word is acceptable within the context of profanity in the one or more data sources.

5. The method of claim 1, wherein a negative number is assigned if the identified word is not acceptable within the context of profanity in the one or more data sources.

6. The method of claim 1, wherein the net profanity factor is determined by summing all individual weights assigned to each identified word.

7. The method of claim 1 wherein a sum of net profanity is calculated by adding net profanity number of all individual words identified for detecting the profanity level within 140-character textual post.

8. The method of claim 1, wherein if no community moderator exists for a given community, then quarantining the 140-character textual post.

9. The method of claim 1, wherein a proprietary look up database based on user input is used as the one or more data sources for a community specific profanity detection.

10. The method of claim 1 wherein assigned weights for each data source are modified as per a profanity tolerance of one or more communities.

11. The method of claim 1 wherein a sequence of lookups for each identified word in a 140-character sentence is altered to improve profanity level detection and/or overall system response.

12. The method of claim 1 wherein a specific sum net profanity number is assigned to one or more communities for decision making on whether or not to publish 140-character textual post.

13. The method of claim 1 wherein data sources for profanity lookup is added or removed for one or more communities.

14. The method of claim 1, wherein parsing to identify all words and checking by the computer in one or more profanity lookup data sources is repeated after removing by the user the identified one or more profane words in the 140-character textual post until no profane words are identified.

15. The method of claim 1, wherein the 140-character textual post is published without deferring to a community moderator if no profane words are identified in 140-character textual post.

* * * * *